UNITED STATES PATENT OFFICE.

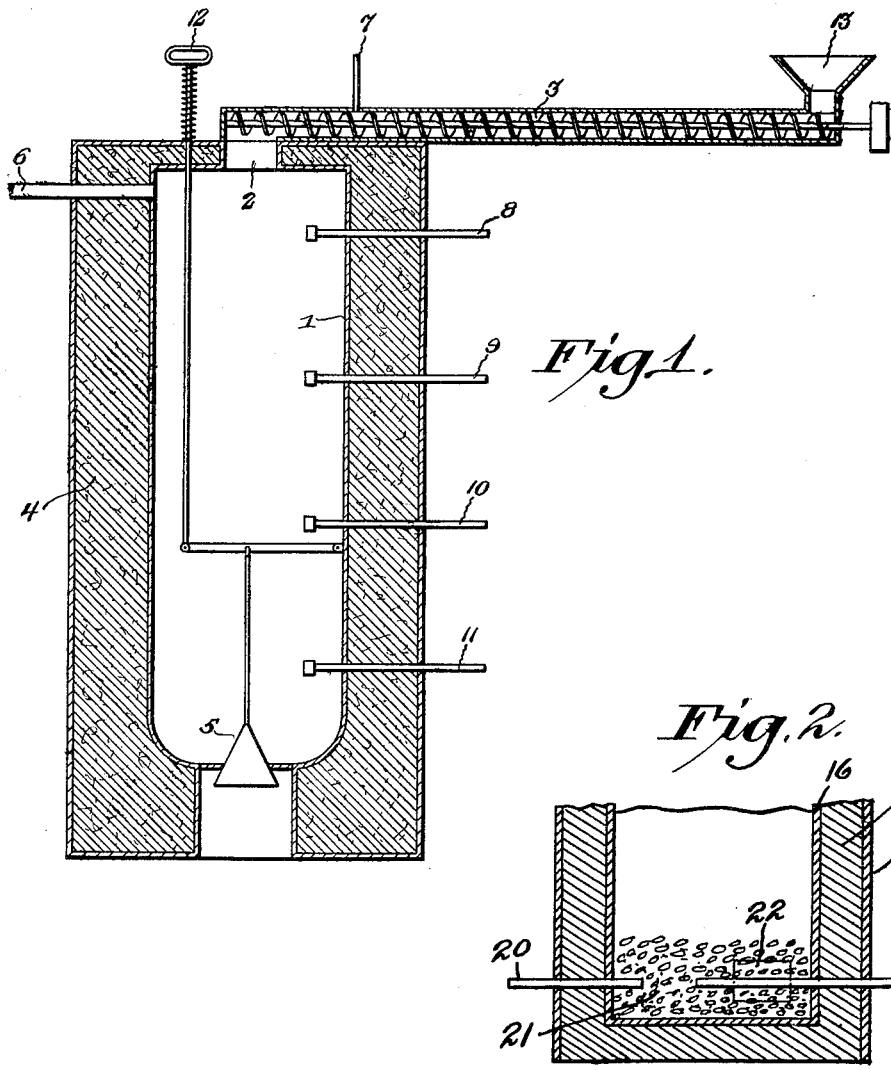

ORIN F. STAFFORD, OF EUGENE, OREGON.

DESTRUCTIVE-DISTILLATION PROCESS.

1,380,262.            Specification of Letters Patent.     Patented May 31, 1921.

Application filed August 29, 1919. Serial No. 321,298.

*To all whom it may concern:*

Be it known that I, ORIN F. STAFFORD, a citizen of the United States of America, residing at Eugene, in the county of Lane and State of Oregon, have invented certain new and useful Improvements in Destructive-Distillation Processes, of which the following is a specification.

The present invention relates to a process of destructive distillation, and while said process is adapted to the distillation of wood, particularly in the form of finely-divided wood, such as sawdust, hogged wood or the like, it is also applicable to the treatment of various other forms of wood and to the treatment of other materials than wood. The process of the present invention is generally applicable to any kinds of organic matter which, like cellulose wood, will, in a measure, undergo exothermic pyrolysis when suitably heated in the absence of air or oxygen. The most important class of materials to which the process is applicable, may be generically designated as materials containing, comprising or consisting in substantial part of carbohydrates, of lignin bodies and the like, or the alteration products of such substances.

As specific examples of substances to which the process is applicable, there may be mentioned (by way of example and not as limiting the invention thereto) wood, woody materials, leaves, straw, chaff, hulls, husks, shells, bark, pits, stalks, pith, bagasse, moss, cobs, fiber, cotton, kapok, hemp, jute, sisal, paper scrap, (all of which materials contain cellulose or lignin, or closely allied substances), also starch, dextrin, gums and other carbohydrates; also certain forms of partially decomposed material of organic origin such as peat or lignite (especially those which are not already substantially completely decomposed) as well as mixtures of such materials as above enumerated with each other or with other substances. Other materials may sometimes be added to the material to be destructively distilled for the purpose of modifying the pyrolysis to produce special effects, if so desired, without departing in the least from the spirit of my invention, which fundamentally concerns a novel and economical use of heat appearing in exothermic pyrolytic reactions, whatever may be the material used.

The present application is in part a continuation of my copending application, Serial No. 190,613 filed September 10, 1917, for which application the present case may be regarded as a substitute.

There have been many processes proposed for distilling sawdust and similar comminuted wood or wood waste, for the production of valuable products including the distillate and the charcoal, but so far as I have been able to ascertain, none of such processes continue to be commercially used, the largest obstacle in the way of many of such processes being the fact that sawdust is an excellent heat insulator, so that while the outside of a mass of sawdust may become sufficiently heated for the purpose of distillation, the interior of the mass is substantially cold, or if the heat is supplied to such an extent as to bring the interior of the mass up to a carbonizing or distilling temperature, the outside portions of the mass, together with the walls of the retort, are greatly overheated.

It is well known that in the destructive distillation of wood, the material first becomes heated up to a temperature usually not exceeding 125° C., where the temperature remains until the water has all been driven off, this heating and drying operation being an endothermic process. Upon further application of heat, the temperature then rises rapidly until a temperature of approximately 280° C., is reached, by which time the distillation proper sets in vigorously. At the temperature of about 280° C., the reaction is exothermic, and an amount of heat is liberated in the course of the reactions which take place which is estimated to be equivalent to about 5% to 8% of the amount of heat which would be generated by the complete combustion of the wood.

I have found that if wood which has previously been dried and somewhat heated be delivered into a vessel having a temperature at or above that necessary for the carbonization of wood (say 400° C.) then the dried and preheated wood so introduced will be carbonized and its decomposition products will distil away from the vessel through an outlet provided for this purpose, and that furthermore, since this act of carbonization is an exothermic process, there is produced within the carbonizing vessel or retort an amount of heat sufficient to initiate the vigorous exothermic carbonization of a new portion of dry preheated wood, should such a portion be added, this, in turn, upon carbonizing, generating the heat necessary to bring a following portion of new material up to a carbonizing temperature and so on, the process being essentially continuous after once being initiated. For this process to be maintained continuously as above indicated, however, it is necessary that there be no material heat losses from the carbonization vessel or retort, excepting such as may occur as the result of the withdrawal or escape of carbonization products. The walls of the carbonization vessel or retort must therefore be protected against heat losses to the exterior by proper heat insulation or by some heat compensation device.

One form of apparatus suitable for carrying out the process of my invention is shown in vertical section in Figure 1 of the accompanying drawing, in which 1 repesents a wood distilling retort which may be of any desired form or dimension. It may be constructed of sheet iron or of other suitable material. This is provided with an inlet opening 2 at which dry preheated wood may be supplied continuously or at such short intervals as may amount to continuity from the pre-heater or combined drier and preheater indicated by the worm conveyer 3. At 6 there is indicated an outlet for the escape of the volatile decomposition products of the carbonization which outlet may and preferably does lead to a condenser. At 5 is an outlet for the discharge of charcoal which, in the form of apparatus indicated, is operated from time to time by means of the discharge lever 12. At 7, 8, 9, 10 and 11 pyrometers are inserted for measuring the temperatures at these several places. The loss of heat from the walls of the carbonization vessel to the exterior is in this instance prevented by a heavy layer of heat insulation material 4. Raw material enters at 13.

While I have described this particular apparatus, I call attention to the fact that numerous other forms of apparatus could be used without departing from the spirit of my invention.

In carrying out the process, the wood, which may be in a finely divided form such as saw dust, is first dried and heated in some form of drier. The degree of drying and pre-heating necessary depends upon and must be coördinated with various factors in the process as well as dimensions of the apparatus, but in any event it is not necessary to carry this drying and pre-heating to the point of carbonization, practical temperatures for the material entering the retort lying between 100° C. and 250° C. The wood in this condition is delivered through the opening 2 into the retort which previously must have been heated to a temperature near or above 400° C. (The retort is most simply heated by building a fire within it while the outlets at 5 and 6 are open to the air, the outlet 5 particularly, being closed completely before starting the flow of raw material into the retort from the pre-heater). The pre-heated wood now entering the retort carbonizes and the continuous production of heat due to the exothermic carbonization process under the described conditions serves to maintain continuously the desired carbonizing temperature as the flow of preheated wood continues to enter.

In a particular test of my process, with an apparatus such as shown in the accompanying drawings, the temperature indicated by the pyrometer 7 was maintained at about 160° C., the wood entering the retort in an unbrowned condition. The bottom of the retort was previously heated by a fire therein. In this run, which commenced at 9:40 a. m., the pyrometers 8, 9, 10 and 11 shown in the drawing, gave readings which corresponded (approximately) to the following temperatures:

| Time. | Pyrometer 8. | Pyrometer 9. | Pyrometer 10. | Pyrometer 11. |
|---|---|---|---|---|
| A. M. | ° C. | ° C. | ° C. | ° C. |
| 10:00 | 460 | 480 | 500 | 500 |
| 11:00 | 390 | 390 | 400 | 360 |
| P. M. | | | | |
| 12:20 | 340 | 340 | 340 | 420 |
| 1:05 | 325 | 325 | 325 | 430 |
| 2:00 | 300 | 300 | 300 | 445 |
| 3:00 | 290 | 280 | 265 | 445 |
| 4:20 | 265 | 260 | 235 | 445 |
| 4:40 | 250 | 245 | 460 | 445 |
| 6:25 | 230 | 200 | 455 | 445 |
| 7:35 | 240 | 260 | 455 | 430 |
| 9:00 | 220 | 220 | 430 | 425 |
| 9:30 | 220 | 335 | 425 | 425 |
| 10:15 | 220 | 430 | 420 | 420 |
| 11:00 | 215 | 440 | 410 | 410 |
| 12:00 | 215 | 445 | 400 | 400 |
| A. M. | | | | |
| 1:00 | 230 | 445 | 400 | 400 |
| 1:15 | 265 | 450 | 395 | 395 |
| 1:30 | 330 | 450 | 390 | 390 |
| 1:45 | 385 | 450 | 390 | 390 |
| 2:00 | 430 | 455 | 390 | 390 |
| 2:10 | 425 | 455 | 390 | 390 |

Run closed at 2:10.

In this run no charcoal was discharged, the carbonization vessel being allowed to fill completely with residual charcoal, and the valve 5 being tightly closed during the entire time. It was shown by actual soundings that the rise in temperature indicated by any pyrometer corresponded to the time at which the reacting mass rose to that level.

Throughout the operation of the process, the gaseous and vaporous material leaving the outlet 6 preferably passes to a condenser in which the liquid products are condensed.

I am, of course, aware that it is common to propagate a reaction, by supplying combustible material, either continuously or intermittently at the top of a mass of such combustible material, which is at the temperature necessary for combustion, a current of air being supplied continuously. In my process, however, there is no combustion taking place in the retort, after the process is started, and there is no air admitted to the mass of wood, except such small amounts of air as unavoidably may leak in at the times of charging or discharging the retort.

I am also aware that from time to time processes of wood distillation have been proposed in which the heat necessary for producing the carbonization is supplied by introducing into the retort, a current of hot inert gases produced from some source exterior to the retort itself. My invention differs from any such process, however, in that after the initiation of the carbonization reaction, no such heat from an exterior source is necessary.

The successful operation of the invention depends upon the prevention of excessive losses of heat from the walls of the retort, by convection or radiation or otherwise, and the utilization of the heat of the exothermic reaction for maintaining the internal temperature. This heat loss may be prevented, preferably by adequate heat insulation, but the invention includes the prevention of this loss broadly, as by compensation or in any convenient manner.

In a modified form of execution of the process (see Fig. 2 of the drawing), the retort may be initially filled up or filled to any desired extent with the carbonaceous material, in a desirably dried and preheated state, and the reaction initiated therein by heating some relatively small zone therein. This latter may be conveniently effected by placing preferably in the bottom of the retort, a layer of charcoal or like material, and embedding electrodes therein, and passing electric current between such electrodes to heat up such charcoal sufficiently to initiate the destructive distillation of the wood resting thereupon. The electric current to the heater then may be shut off.

In such a modification it would be advisable to so stack the material in the retort, as to allow a uniform up-flow of the vaporous and gaseous products of the reaction, through the mass. This might also be aided by suction applied at the top of the retort. This process is, of course, carried out in the substantial absence of free oxygen (*e. g.* in an inert atmosphere). It is the intention to exclude all free oxygen, except such as is present in the air unavoidably present in the pores and interstices of the material charged to the retort, and such small amount of air as is in the retort at the commencement of the operation.

Fig. 2 represents a vertical section of the lower end of an apparatus in which the modification of the process mentioned above may conveniently be carried out. In said figure, 16 represents the lining of a retort, surrounded by heat insulating material 17, and provided, if desired, with a casing of iron, wood or other rigid material 18. 19 and 20 represent suitable electrodes, the inner ends of which are buried in granular charcoal 21. 22 represents a suitable door for the removal of the charcoal produced by destructively distilling wood or the like, this door normally being kept tightly closed during the destructive distillation process itself.

The specific procedure described herein is given merely by way of example and not as limiting the invention thereto.

What I claim is:

1. A process of distilling wood which comprises supplying comminuted loose dried wood at a temperature of from about 100° C. to 250° C., to the wood distilling retort, some part of said retort being already at a wood-carbonizing temperature, and maintaining the material in the said distilling retort at the temperature of destructive distillation, by the exothermic reaction therein, and without externally heating said retort after the process of distillation is initiated within it.

2. In the destructive distillation of wood, the step of heating the wood under treatment while out of contact with substantial amounts of air, said heating operation being effected, after the commencement of the operation, substantially by the heat produced in the exothermic wood carbonizing reaction, while continuously supplying wood to be treated.

3. In the destructive distillation of wood, continuously supplying substantially dry wood to a mass of such wood at least a part of which is maintained at not below about 280° C., solely by the exothermic reaction proceeding therein, while substantially excluding free oxygen therefrom.

4. In destructive distillation, the steps of maintaining a mass of wood at a temperature at which an exothermic destructive distillation reaction occurs, without combustion, and supplying additional wood thereto at a lower temperature, whereby said reaction propagates itself into and through the said additional wood so supplied.

5. A process of destructively distilling wood which comprises first heating comminuted wood to a temperature of materially over 100° C., then supplying the dried comminuted wood to a heat-insulated retort, some part of which is at a temperature materially above 280° C., whereby an exothermic destructive distillation reaction takes place in the wood so introduced, continuing to add the dried comminuted wood to the material in said retort while such material maintains itself at a temperature materially above 280° C., whereby the reaction propagates itself through the material so added, and maintaining such retort substantially free from the ingress of air.

6. In the destructive distillation of wood, the step of propagating an exothermic reaction through a mass of dry comminuted wood, at substantially below a red heat but not below about 280° C., and without introducing substantial quantities of air to said wood, while continuing the addition of wood material to said mass.

7. In the destructive distillation of materials which, like wood, during such destructive distillation produce by exothermic reaction, a considerable amount of heat; the step of maintaining a temperature capable of producing such destructive distillation, after the distillation process has been initiated, by means of the exotheremic reaction heat of the materials being destructively distilled and protecting the material under treatment from undue heat losses to its environment, while adding further amounts of the material under treatment whereby the process is made continuous, such operations being conducted in the absence of substantial amounts of air.

8. A process of destructively distilling woody material which comprises establishing within some part of a distillation retort, a zone having a sufficiently high temperature to effect destructive distillation of such woody material, introducing woody material to said zone while such material is in a substantially dry condition, whereby an exothermic wood-distilling reaction takes place in the woody material so introduced, and continuing the introduction of woody material, without allowing excessive losses of heat by radiation from the said retort, and without supplying to the material in the retort, after the commencement of the operation any considerable quantity of heat other than that produced by the said exothermic destructive distillation reaction.

9. In the destructive distillation of wood, the step of maintaining a temperature capable of producing destrictive distillation, after the distillation process has been initiated, by means of the exothermic reaction heat of the wood being distilled, while adding further quantities of sufficiently dry wood to that under treatment so that the process can be operated continuously and in the substantial absence of air.

10. In the destructive distillation of wood, the step of maintaining a portion of the wood under treatment at a temperature at least as high as that necessary for the destructive wood distillation, in a vessel in which substantially the entire amount of heat necessary for the distillation is supplied, after the distillation process is initiated, by the exothermic decomposition reactions taking place in the wood being distilled therein, supplying to said vessel further portions of wood in a sufficiently hot and dry condition to enable the exothermic reaction to propagate itself throughout the mass of material so introduced, whereby the process is rendered continuous.

11. In destructive distillation of material containing organic constituents capable of undergoing exothermic pyrolysis, a process of maintaining a temperature capable of producing destructive distillation in a vessel by the exothermic reaction heat produced therein, after such process has been initiated in said vessel, and without admitting substantial amounts of air, adding to the vessel new portions of the material capable of undergoing destructive distillation with the liberation of heat, said added material being sufficiently hot and sufficiently dry to allow the destructive distillation reactions to propagate themselves throughout the mass.

12. The process of destructive distillation of material comprising carbon-containing constituents capable of undergoing exothermic pyrolysis, which comprises first heating a small fraction only of the total bulk of material to be destructively distilled, to a temperature capable of initiating an exothermic destructive distillation reaction therein, continuing the addition of such material to that undergoing the exothermic reaction, the amount of heat liberated by the exothermic reaction being at least substantially sufficient to propagate the reaction through the mass, and during the entire process, after the commencement of the exothermic reaction, maintaining the reaction temperature principally by means of the heat liberated in such reaction, the amount of material added after the first mentioned step being many times greater than the amount treated in such step.

13. In the process of destructive distillation of material consisting, at least in substantial part, of carbohydrate, of lignin, of lignocellulose, and the like, the step of maintaining the temperature necessary for the reaction, after the destructive distillation operation is initiated, substantially by means of the heat produced in the exothermic destructive distillation reaction, while, without admitting substantial amounts of air, supplying additional quantities of the material under treatment for continuing the process, the amount of material added after the destructive distillation reaction has commenced being many times greater than the amount of material treated in initiating such destructive distillation reaction.

14. In the destructive distillation of material composed in substantial part of carbohydrate or lignin substances, the steps of supplying such material to a closed distillation retort, at some part of which there exists a temperature sufficient to produce destructive distillation of such material, the said material being sufficiently hot and sufficiently dry so that the effective heat produced in the destructive distillation reaction will be sufficient to propagate the reaction throughout the mass of material so introduced, and, without burning the solid reaction product, continuing to introduce fresh material whereby the process is rendered continuous, and substantially self-supporting as to heat units.

15. The herein described step in the destructive distillation of carbonaceous material, which consists in bringing such material up to a condition of active destructive distillation, in an inert atmosphere by the heat of the exothermic distillation of such material, such material being sufficiently hot and dry to render the reaction self-propagating.

16. A continuous process for the destructive distillation of carbonaceous material, which consists in continuously supplying such material in a sufficiently hot and dry state to a suitable retort containing an inert atmosphere, and distilling such material by the heat produced by the exothermic distillation reaction of previously supplied material.

17. In the destructive distillation of carbonaceous material, which like wood is capable of destructive distillation with the production of a substantial amount of exothermic reaction heat, the step of initiating the destructive distillation of a mass of such material by extraneous heat applied locally to a small part only of the mass of material being treated, and allowing the exothermic reaction to propagate itself throughout the mass in an inert atmosphere.

18. The process of destructively distilling carbonaceous material which like wood is capable of destructive distillation with the production of a substantial amount of exothermic reaction heat, which comprises continuously supplying such carbonaceous material in a sufficiently high and dry state to a suitable retort, and destructively distilling the same therein in an inert atmosphere by the heat produced by the exothermic destructive distillation reaction of the so supplied material and that previously supplied.

19. In the destructive distillation of material which, like wood, is capable of undergoing exothermic pyrolysis, the step of propagating an exothermic reaction through a mass of substantially dry comminuted material of the character specified, at substantially below a red heat but not below about 280° C., and without introducing substantial quantities of air to said material, while continuing the addition of further quantities of such material to said mass.

In testimony whereof I affix my signature.

ORIN F. STAFFORD.